(12) United States Patent
Curtis

(10) Patent No.: US 7,577,140 B2
(45) Date of Patent: *Aug. 18, 2009

(54) METHOD AND APPARATUS FOR AUTOMATICALLY DETERMINING AN APPROPRIATE TRANSMISSION METHOD IN A NETWORK

(75) Inventor: Pavel Curtis, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 541 days.

This patent is subject to a terminal disclaimer.

(21) Appl. No.: 11/049,330

(22) Filed: Feb. 1, 2005

(65) Prior Publication Data

US 2005/0141507 A1 Jun. 30, 2005

Related U.S. Application Data

(63) Continuation of application No. 10/056,074, filed on Jan. 28, 2002, now Pat. No. 6,891,830.

(60) Provisional application No. 60/264,060, filed on Jan. 26, 2001.

(51) Int. Cl.
*H04L 12/28* (2006.01)
*H04J 3/26* (2006.01)
*H04J 3/22* (2006.01)
*G06F 15/16* (2006.01)

(52) U.S. Cl. .................. 370/390; 370/432; 370/467; 709/227; 709/230

(58) Field of Classification Search ................. 370/261, 370/432, 389, 401, 467, 392, 356, 352, 390; 709/227, 230

See application file for complete search history.

(56) References Cited

U.S. PATENT DOCUMENTS

| 4,745,593 | A | * | 5/1988 | Stewart | 370/244 |
| 5,251,205 | A | * | 10/1993 | Callon et al. | 370/392 |
| 5,802,042 | A | * | 9/1998 | Natarajan et al. | 370/255 |
| 6,006,267 | A | * | 12/1999 | Nguyen et al. | 709/227 |
| 6,259,701 | B1 | * | 7/2001 | Shur et al. | 370/401 |
| 6,870,843 | B1 | * | 3/2005 | Stewart | 370/390 |

* cited by examiner

*Primary Examiner*—Derrick W Ferris
*Assistant Examiner*—Nishant B Divecha
(74) *Attorney, Agent, or Firm*—Perkins Coie LLP

(57) ABSTRACT

A method for automatically sensing a transmission method in a network, includes transmitting at least one packets to a first host via a first transmission method, transmitting at least one packets to the first host via a second transmission method, and configuring for communication with the first host in accordance with the second transmission method, provided a response to a packet transmitted in accordance with a second transmission method is received.

7 Claims, 10 Drawing Sheets

112

114

METHOD AND APPARATUS FOR AUTOMATICALLY DETERMINING AN APPROPRIATE TRANSMISSION METHOD IN A NETWORK

CROSS-REFERENCE TO RELATED APPLICATION(S)

This application is a continuation of U.S. patent application Ser. No. 10/056,074, filed on Jan. 28, 2002, now U.S. Pat. No. 6,891,830 which application claims the benefit of U.S. Provisional Application No. 60/264,060, filed on Jan. 26, 2001, which applications are incorporated by reference herein in their entireties.

FIELD OF THE INVENTION

This invention relates to the field of network communications and more particularly to the field of determining the transmission method for a network communication.

BACKGROUND OF THE INVENTION

One of the most common network protocols used today is TCP/IP. The TCP/IP suite typically consists of four layers: the application layer, the transport layer, the network layer, and the link layer.

At the application level, once a user has requested that data be sent from a source application to a destination application (or another instance of the same application) the source application packages the data, in accordance with its own routines, such that it can be read by the destination application. Once packaged by the source application, it is sent to the transport layer, which packages the data for transmission between hosts. At this layer, destination address information is added to the data package. More specifically, an IP address identifies the destination host and a port address identifies the application to which the data is being sent. The data package is then sent to the network layer, which provides the information necessary for routing the information across the network to the destination host. Finally, the link layer provides the command and the information necessary for the interface to actually send the packet. Once the data package arrives at the destination host, each layer is peeled away until the destination application can decode the data contained in the package.

In the TCP/IP suite, there are two major transport-level protocols for transporting application data across the Internet: Transmission Control Protocol (TCP), and User Datagram Protocol (UDP). TCP is based on the notion of a "connection" between two hosts, within which they can send data to each other reliably, without the possibilities that: (1) the data will be lost along the way, or (2) the data will be received in a different order than it was sent. TCP is used, for example, for essentially all web browsing, file transfers, and email transmissions.

UDP, on the other hand, is based on the underlying IP model, in which data is sent in individual packets from one host to another. In UDP, any given packet may well: (1) not arrive at its destination, or (2) arrive more than once even though it was sent only once, or (3) arrive before the arrival of other packets that were sent earlier. UDP is used in contexts where it is not essential that all of the data arrive at the destination (perhaps because the application is detecting and recovering from packet loss), or where the transmission-latency costs of TCP (e.g., connection set-up, data retransmissions, etc.) are unacceptable. A common example of a type of transfer in the Internet today that uses UDP is the transmission of streaming audio and video data.

Within UDP, there are two major methods for data packets to be addressed and delivered: unicast and multicast. In both methods, each UDP packet contains source and destination addressing information and a UDP "port" number.

In the unicast method, the sending application uses its host's own IP address and the application's own UDP port number as the source addressing information. For the destination addressing information, the sending application uses the IP address of the remote host with which it intends to communicate and the UDP port number of the specific application on that host intended to receive the data. When the packet is sent, the network makes a "best effort" to deliver the packet to the host and application described in the destination addressing information.

In the multicast method, the source addressing information is set exactly as in the unicast method, but the destination information is different. Here, one of a special set of IP addresses is used to describe not a single host, but rather a whole set of hosts. These multicast addresses function like radio frequencies: any individual host on the network can, without prior notice or central coordination, dynamically register its interest in receiving anything sent to a particular multicast address, in the same way one might tune a radio receiver to a particular frequency. When a UDP packet is sent using a multicast address for the destination addressing information, the network makes a "best effort" to deliver one copy of the packet to every host that has registered interest in that address. Further, the network attempts to accomplish this delivery in an efficient manner, sending only one copy of the packet across any particular network link. For applications where there are multiple receivers of the same transmitted data, it is much more efficient to send a single copy by multicast than to send multiple copies of the same packet to each individual receiver via unicast. While it is sometimes useful for a user to be able to express a preference for unicast transmission even if multicast would work, in most circumstances, it is better if all multicast-capable clients use multicast, leaving unicast use only to non-multicast-capable clients.

In addition, it is important in many applications for the server to be able to determine the source of each data packet it receives. Packets from different clients might be handled differently by the server (and some packets, such as those that did not come from a registered client, may be ignored altogether). Further complicating the situation is the fact that certain network components, architectures, and applications may affect the source address found in packets sent by the client. More specifically, multi-homed computers (i.e. computers that have more than one IP address, usually with each address assigned to a different network interface) may affect which source address the client should use. For example, a host might have one or more Ethernet cards, dialup modems, or a combination of the two. When an application on a multi-homed computer sends a network packet, the IP source address in that packet may be any one of the interfaces available. The choice of source address is determined by several factors, including which interfaces are currently enabled (e.g., an Ethernet card may not have a cable connected to it, or a dialup modem might not currently be engaged in a phone call), and the network's routing topology (e.g., a server might be reachable from one Ethernet connection to a client, but not from any of the others, or the server might simply be closer, in network hops, via one Ethernet connection than another). It is often not feasible for an application to determine a priori which IP source address will be used for any given UDP packet transmission. Most operating systems do not provide any mechanism for applications to acquire this information directly.

A client's choice of source addresses may be further affected when the network utilizes a Network Address Translator (NAT) device. For a variety of reasons, including security and the difficulty of acquiring large blocks of public IP addresses, many organizations use a set of private-use-only IP address ranges internally. As a result, many of the IP addresses used within the network become invalid for use outside the local network. To remedy this, some organizations or local area networks, at the border between their internal networks and the public Internet, deploy a NAT device. The NAT device maps local, or private-use-only IP addresses to available globally-valid addresses. When using a NAT device, the user of a client in a local network can send a communication to a client outside the local network using its local IP address, regardless of whether the IP address is globally valid. The NAT device transparently maps the local address to a globally-valid address and sends the communication to that globally-valid IP address. Any response from the client arrives at the NAT device, at the globally-valid IP address. The NAT device maps the address back to the local IP address for communication back to the original sender. As a result of the mapping performed by the NAT device, it may be very difficult for a client to determine, a priori, which source IP address will be seen by a given server when the client communicates with it.

In peer-to-peer UDP applications, data is transmitted via UDP among a group of clients across a digital network. Each packet of data transmitted by one client is intended to be received by all of the other clients. For example, in a multi-party audio conversation application, the digital audio samples representing each utterance by one user should be transmitted to all other users participating in the same conversation. Since each transmitted packet of data is to be delivered to multiple destinations, such an application is a good match for the capabilities provided by multicast. Unfortunately, multicast delivery is not currently supported everywhere on the Internet. Worse, there is no way for one host to know, a priori, whether multicast delivery is supported between that host and any specific other host on the network.

As a result, most such applications simply ignore the possibility of using multicast delivery and rely exclusively on unicast, thereby forgoing any potential bandwidth savings that might accrue from using multicast where possible.

A more useful alternative allows each multicast-capable client to use multicast while non-multicast-capable clients use unicast. To achieve this, a server acts as a kind of gateway between those clients that can use multicast and those that cannot.

Technically, essentially all clients are capable of using multicast, but the networks between them may not be capable of (or configured to allow) carrying multicast traffic between them. In the theoretical worst case, multicast connectivity could be enabled or disabled independently between every pair of clients. This could only be done, however, in a network (or set of networks) that is configured without regard to the normal criteria used in designing networks, such as the efficient use of bandwidth and consistency among computers within the network. It is therefore sufficient to determine just whether or not each client can communicate via multicast with the server. In a network that is configured reasonably, if two different clients can each use multicast to communicate with the server, then they should be able to use multicast to communicate with each other.

Whenever a multicast-capable client sends a packet, the server receives it (along with all of the other multicast-capable clients) and transmits copies of the packet via unicast to each of the non-multicast-capable clients. Whenever a non-multicast-capable client wishes to send a packet, it sends it via unicast to the server. The server then transmits one copy via multicast to all of the multicast-capable clients simultaneously, and multiple other copies via unicast, one to each of the other non-multicast-capable clients. In this way (ignoring possible packet loss in the network, inherent in all UDP transmissions), any packet sent by any client (whether multicast-capable or not) is ultimately received by every other client. At the same time, overall network usage is decreased relative to the all-unicast approach described earlier.

In this hybrid unicast/multicast approach, the server needs a list of all of the non-multicast-capable clients, so that it can know where to re-transmit the packets it receives. It is helpful as well, if the server also has a list of all of the multicast-capable clients. When that list is empty, the server can avoid retransmitting received unicast packets via multicast, further reducing network usage. A simple mechanism for maintaining these lists is to require each client to register with the server (via some reliable communications medium, such as TCP connections) when joining the application and to unregister from the server when leaving. For each client, the server needs to know whether transmissions to and from that client should be sent via unicast or multicast, and the IP address and (unicast) UDP port of the client. The latter is needed for three purposes: (1) for unicast clients, so that the server knows where to re-transmit packets intended for that client; (2) for all clients, so that the server can tell which client sent any given packet received by the server; and (3) so the server can ignore any received packets that did not come from a registered client.

While it is sometimes useful for a user to be able to express a preference for unicast transmission even if multicast would work, usually it's better if all multicast-capable clients use multicast, leaving unicast use to non-multicast-capable clients. The vast majority of users, however, are not competent to determine whether their clients and/or networks are multicast-capable in the context of any particular application. Similarly, most users are not competent to determine whether their computers are multi-homed, or, if so, which of the multiple available IP addresses will be used in the context of any particular application. Finally, most users are not competent to determine whether network transmissions to and from their computers within the context of any particular application will traverse a NAT unit or, if so, what form the NAT modifications will take. In summary, prior art techniques do not assist a computer user in fully optimizing packet communication over a network.

There is a need to overcome these and other shortcomings of the prior art and to provide an efficient method for seamlessly optimizing communication over a network. The present invention, as illustrated in the following description, is directed to solving one or more of the problems set forth above.

SUMMARY OF THE INVENTION

In accordance with the present invention, a method for automatically sensing a transmission method in a network, includes transmitting at least one first packet to a first host via a first transmission method, transmitting at least one second packet to the first host via a second transmission method, and configuring for communication with the first host in accordance with the second transmission method, provided a response to a packet transmitted in accordance with the second transmission method is received.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
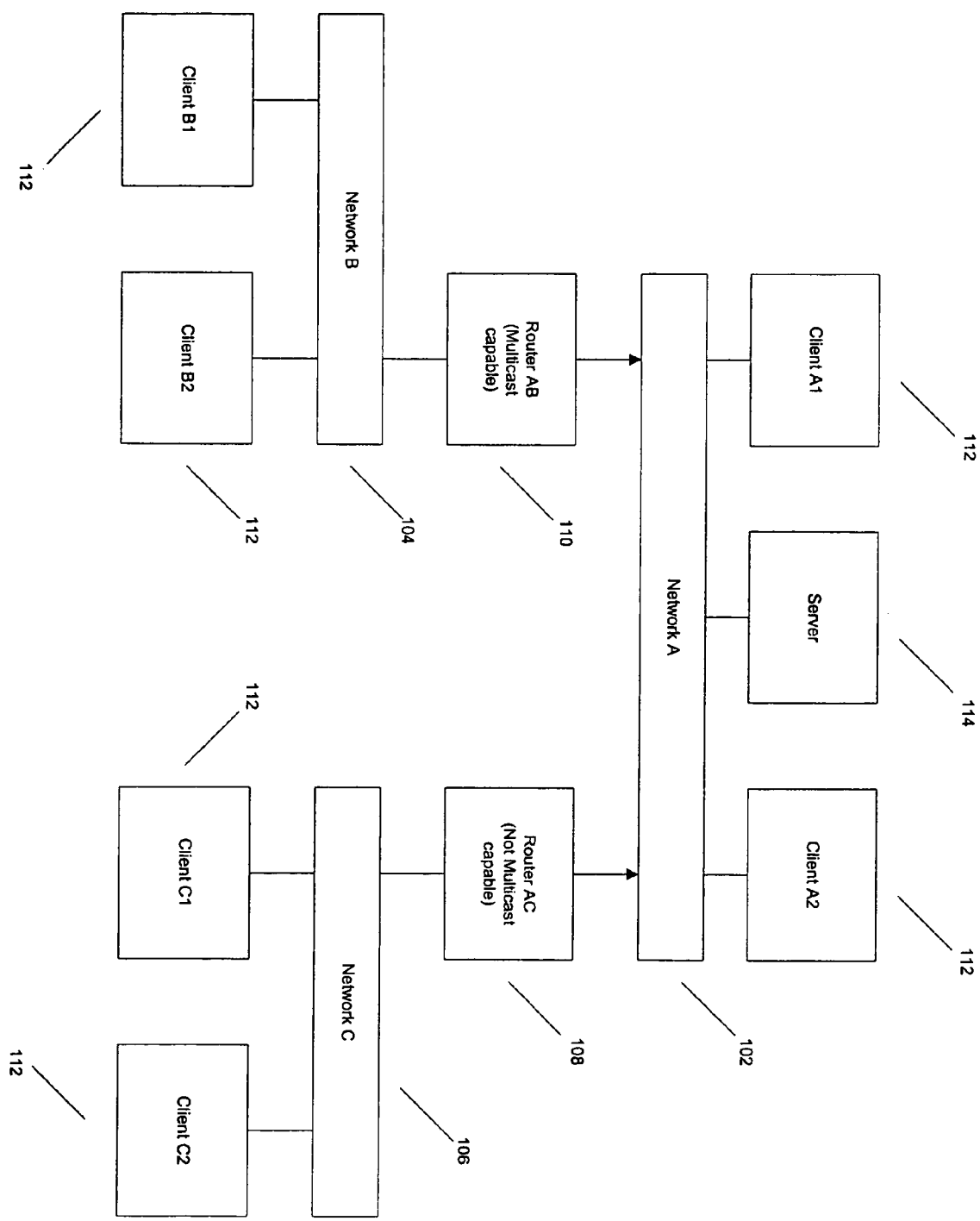
FIG. 1 is an exemplary diagram of a network having a multicast and a unicast sub network.

A UDP network environment typically consists of a plurality of local area networks, or LAN's. FIG. 1 shows an exemplary UDP network environment 100 including three local area networks 102, 104, 106, and two routers, router AC 108 and router AB 110. Local area network 102 consists of clients 112, and server 114. Local area networks 104, and 106 each consist of a plurality of client computers 112.

Router AC 108, which is not multicast capable, forms the border between LAN 106 and LAN 102. Router AB 110, which is multicast capable, forms the border between LAN 102 and LAN 104. In a typical network configuration, client computers 112 may communicate via either unicast or multicast transmission methods with server computers on the same LAN. However, clients on one LAN may not be able to communicate with a server on another LAN, depending on the capabilities of routers between the LANs. For example, because router AC 108 is not multicast capable, clients 112 on local area network 106 may not communicate with server 114 on LAN 102 via the multicast method. However, because router AB 110 is multicast capable, clients 112 on LAN 104 may communicate with server 114 on LAN 102 via either unicast or multicast.

Figure 2:
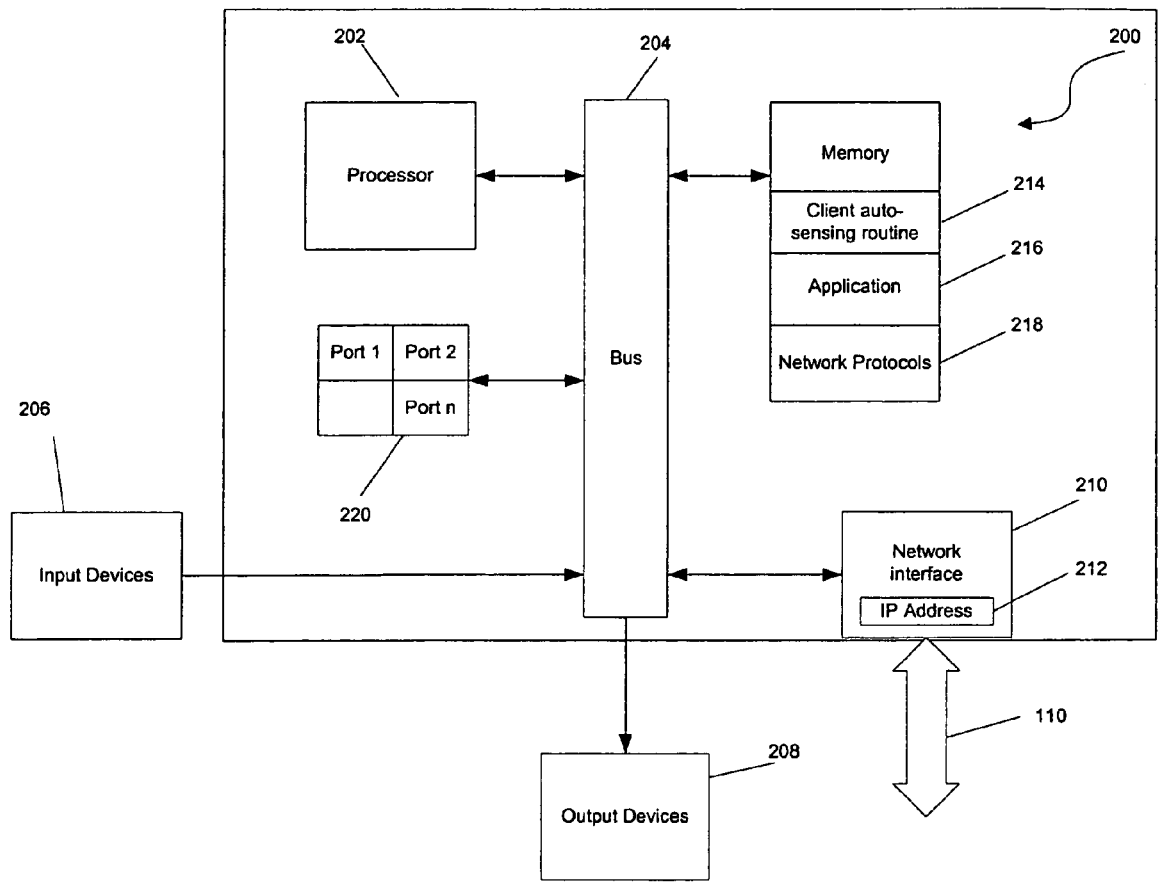
FIG. 2 is an exemplary diagram of a client capable of hosting an embodiment of the present invention.

Referring to FIG. 2, there is depicted a detailed block diagram of a client computer 112 as previously shown in FIG. 1. Client 112 includes memory 200, processor 202, bus 204, input devices 206, output devices 208, and network interface 210. Input devices 206 may include a mouse or keyboard, and output devices 208 may include a screen display or printer. Network interface 210 allows client 112 to communicate with other computers across network connection 110. As shown in FIG. 2, each network interface 210 further includes a unique IP address 212 that distinguishes the client on the network. While it is not shown in FIG. 2, it is important to keep in mind that client 112 may be a multi-homed client. In other words, client 112 may include multiple network interfaces, each associated with a unique IP address. Memory 200 further includes client auto-sensing routine 214, application 216, network protocols 218, and UDP ports 220. In operation, each application may be assigned a UDP port number 220 to uniquely identify it to applications running on other computers. Client 112 may have other components as well, but these are not shown to facilitate description of the unique aspects of this embodiment of the invention.

Figure 3:
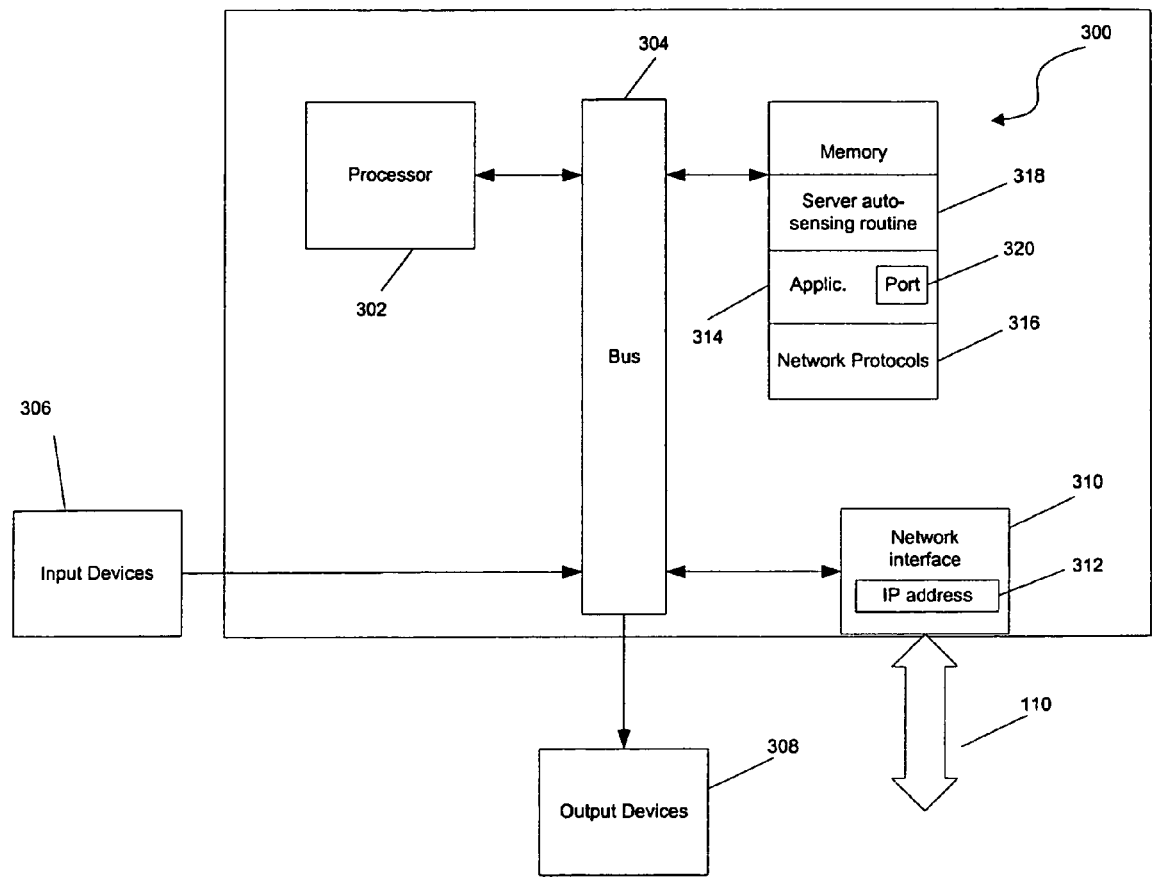
FIG. 3 is an exemplary diagram of a server capable of hosting an embodiment of the present invention.

FIG. 3, depicts a block diagram of server 114, in accordance with one embodiment of the invention. Server 114 includes memory 300, processor 302, bus 304, input devices 306, output devices 308, and network interface 310. Input devices 306 may include a keyboard or mouse, and output devices 308 may include a screen display or printer. In addition, network interface 310 includes IP address 312 for identification of the interface across the network.

As further shown in FIG. 3, memory 300 includes application 314, network protocols 316 and server auto-sensing routine 318. Application 314 has a UDP port 320 associated with it. Server 114 may have other components as well, but these are not shown to facilitate description of the unique aspects of this embodiment of the invention.

In the course of processing, application 216 may wish to communicate with other computers connected to network connection 110. When initiated, processor 202 will allocate a UDP port 220 to application 216. Application 216 will package data (not shown) for transmission. The assigned UDP port number will identify application 216 for network communication purposes until it is terminated. Client auto-sensing routine 214, as will be explained later, identifies the best transmission method with server 114. In accordance with the identified transmission method, network protocols may then require the addition of other information to the data packet. For example, if application 216 is transmitting data via UDP, network protocols for UDP may require that an IP address identifying the network interface over which the packet may be sent, and an assigned UDP port number identifying the source application be added to the packet. In addition, the network protocols may require destination address information, such as a destination IP address and destination UDP port number, be added to the message. As previously noted, the destination address information may be different depending on whether the client is using UDP unicast or multicast transmission. Finally, any other information required by the transport, network, and link layer protocols will be added. The processor will then send the data packet, including all the added information to network interface 210 for transmission across network connection 110.

In addition, server 114 continually runs server auto-sensing routine 318, which reports the success or failure of a test, run by client auto-sensing routine 214 back to the client. Based on these results, the client will then choose the best transmission method for communication with server 114. Network protocols 316 designate the information to be added to a data packet, and the packet is then sent to the network interface for communication across network connection 110.

Figure 4:
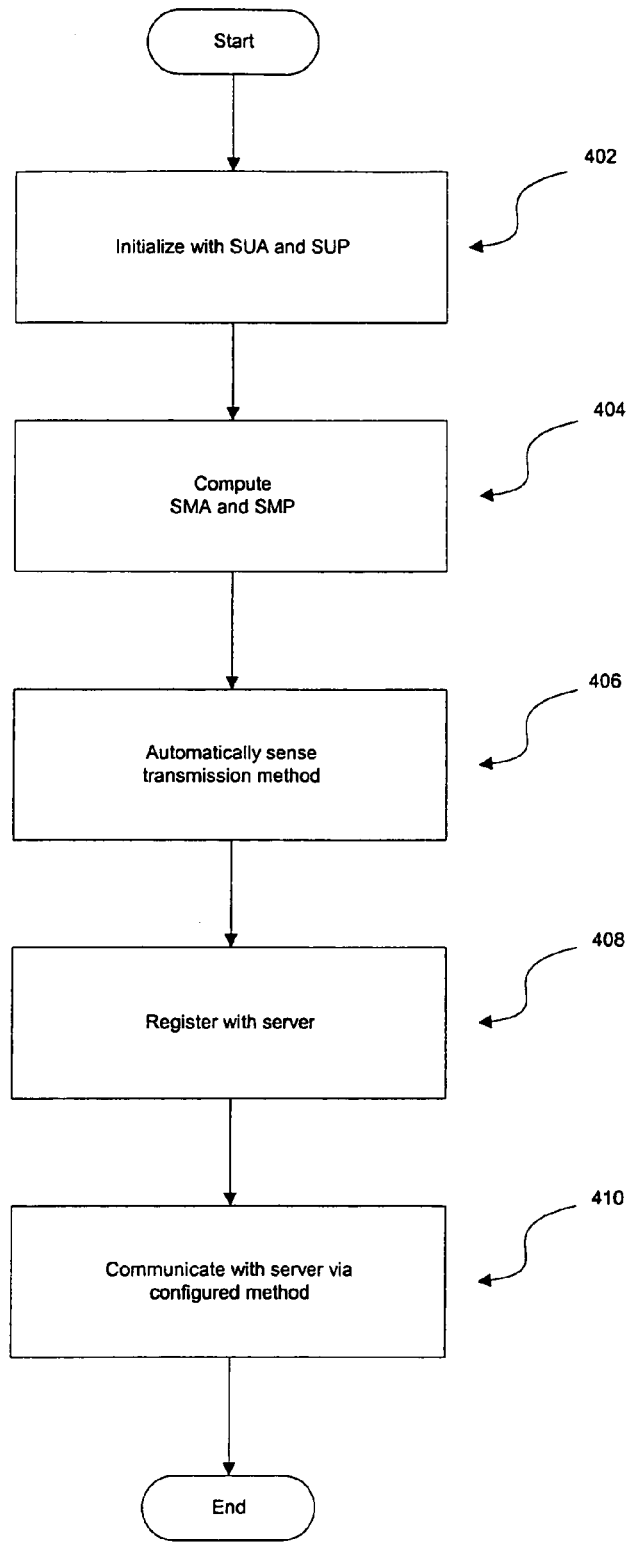
FIG. 4 is a flowchart depicting the steps performed by a client computer consistent with one embodiment of the present invention.

Referring to FIG. 4, a detailed flow diagram is shown that describes the process for automatically determining an appropriate transmission method in a network in accordance with one embodiment of the present invention. For the sake of brevity, FIG. 4 will be explained from the perspective of client 112, configuring to communicate with multicast server 114. The process of communicating across network 100 begins when client 112 is initialized. Referring to FIG. 4, it is shown that client 112 is initialized with the Server Unicast Address (SUA) and Server Unicast Port (SUP) (step 402). The SUA is IP address 312 of server 114. The SUA is used as the destination address for all unicast transmissions to server 114, and allows network 100 to route the packet to server 114 via network interface 310. The SUP of server 114 is the UDP port address 320 associated with application 314, the intended recipient of the data. The SUP will be used for all unicast transmissions to server 114. The SUP allows network protocols 316 on server 114 to identify application 314 as the destination of the data packet.

After initialization, processing flows to step 404, where the client computes the corresponding Server Multicast Address (SMA) and Server Multicast Port (SMP). While the SUA and SUP identify the destination IP address and UDP port for all unicast transmissions, client 112 must compute the corresponding IP and port addresses for use with multicast transmissions. Multicast transmissions utilize a specific range of IP addresses, which may range from 224.0.0.0 to 239.255.255.255. These IP addresses constitute the full range of IP addresses in which the high-order (left-most) 4-bits equal 1110.

The client performs the computation of the SMA from an SUA of the following form:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    SUA-1      |    SUA-2      |    SUA-3      |    SUA-4      |
+-+-+-+-+-+-+-+-+-+-+-+-+-+-+-+-+-+-+-+-+-+-+-+-+-+-+-+-+-+-+-+-+
```

Client 112 computes the SMA by compressing the four 8-bit words, which make up the SUA (SUA-1, SUA-2, etc.) into 28 bits, while the now empty high-order 4 bits are filled in with 1110. Server 114 will listen for messages sent to the SMA.

The compression is performed using the XOR function to overlap bits from each of the four 8-bit words. Using the syntax of the C programming language, the code may look like:

SMA=(224<<28)
^(((SUA>>24) & 0xFF)<<20)
^(((SUA>>16) & 0xFF)<<14)
^(((SUA>>8) & 0xFF)<<7)
^(((SUA>>0) & 0xFF)<<0)

In this manner, the number 224 (binary 1110 0000) is shifted left 28 bits and XOR'ed with the other arguments in the equation. Within each set of parenthesis, each 8-bit byte of the SUA is isolated, shifted, and overlapped with 224. For example, right shifting the SUA by 24 bits moves the high-order 8 bits of the SUA into the position of the low-order 8 bits. Then, this is AND'ed with 0x FF (a low-order 8-bit byte of all ones), so that the high-order 24 bits are zeroed out. The resulting 32 bits consist of 24 high-order 0-bits, followed by the 8 bits that once appeared as the high-order 8 bits but are now in the low-order position. This bit string is then shifted left, such that the 8 non-zeroed bits are in a new position. In the case of the 8 high-order bits, they are shifted left 20 bits. This process is performed to isolate each 8-bit string within the original 32-bit SUA, and shift it into a new position. Once the 224 and each 8-bit string is moved into its new position, the five arguments are combined by XOR'ing them. The result is the SMA in which four bytes are overlapped to pack the original 32 bits into the 28 bits (low-order) available for choosing a multicast address. The result appears in the following format:

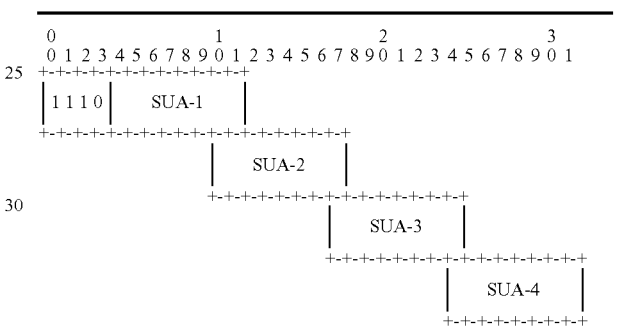

The SMP may also be calculated from the SUA and SUP. Again, in the C programming language format, the code may take the following form:

$$SMP=1024+((SUP\char`\^(SUA\ \&\ 0xFFFF))\ \&\ 0x7FFF)$$

The SMP formula combines (again, with XOR) the low-order 2 bytes of the SUA (i.e., SUA-3 and SUA-4 from the inputted SUA address) with all of SUP, zeroes the highest-order bit (by AND'ing with 0x7FFF, to avoid overflow in the next step), and then adds 1024 (to ensure that the resulting port number will not be in the range 0-1023, reserved for use by "privileged" applications on many operating systems).

Once the SMA and SMP have been computed, and in order to register with server 114, processing flows to step 406, where client 112 runs client auto-sensing routine 214. This routine allows client 112 to automatically sense whether it can communicate with server 114 via the multicast transmission method at the computed address. In addition, performance of this step will allow client 112 to determine whether server 114 may receive packets sent from IP address 212 and UDP port.

Client 112 may then register with server 114 (step 408). The steps involved in registering with server 114, are outside the scope of this invention. Once client 112 has registered, processing then flows to step 410 where client 112 may communicate with server 114 in accordance with the configured transmission method (step 410).

Figure 5:
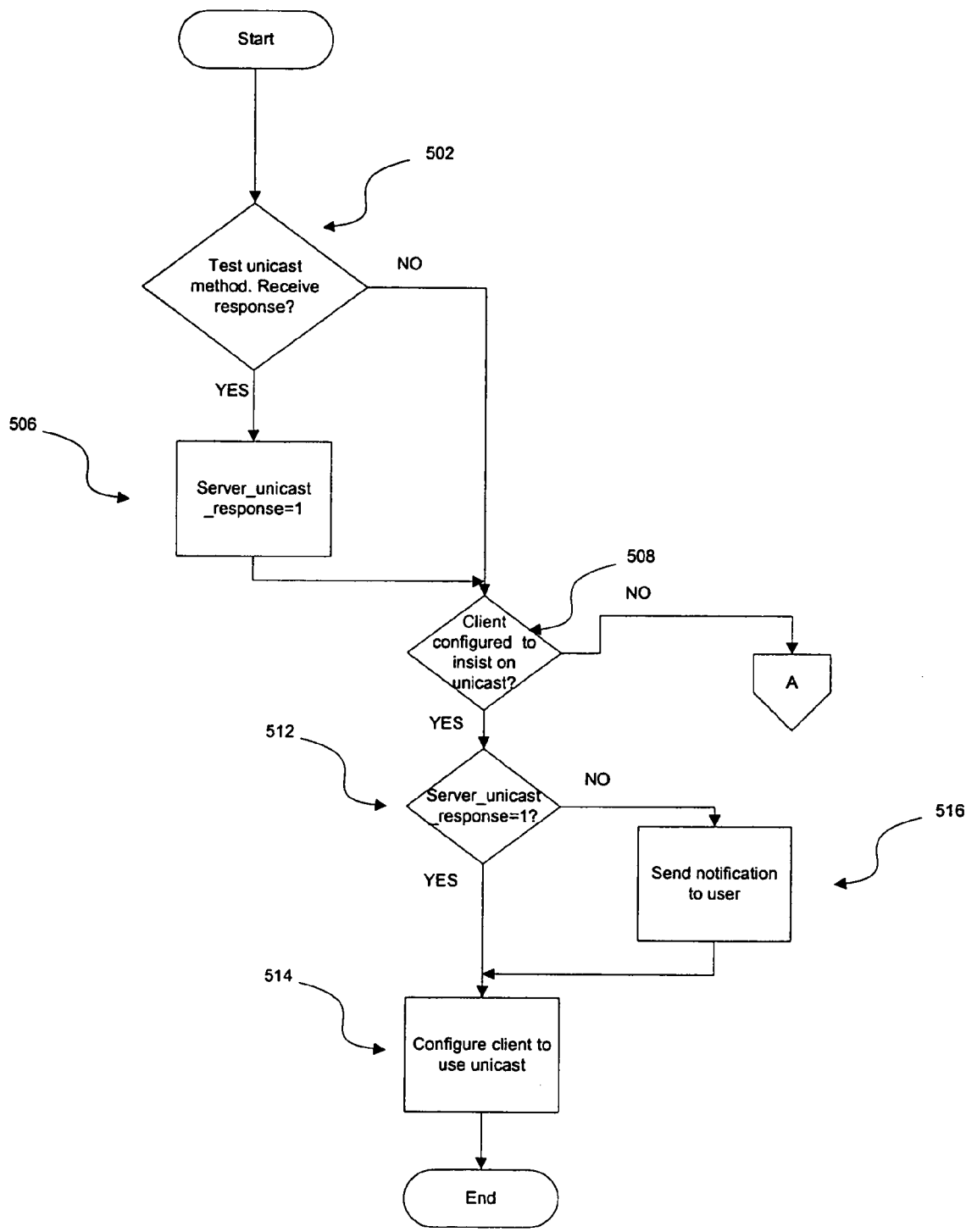
FIG. 5 is a flowchart depicting the steps performed by a client to automatically sense a transmission method consistent with one embodiment of the present invention.

Referring now to FIG. 5, a detailed flow diagram depicts the steps performed by routine 214 to automatically sense the transmission method as depicted in step 406 (FIG. 4). Routine 214 will first test the unicast method (step 502) to determine whether it can communicate with server via the unicast transmission method at the SUA 312 and SUP 320. The test of the unicast method may or may not result in a response from server 114. If a response is received, then client 112 stores an indication of a successful response (step 506), such as by storing a "1" in a Boolean variable server_unicast_response. Processing then flows to step 508.

If no response is received (step 502), processing immediately flows to step 508 where routine 214 determines whether client 112 has been configured to insist upon the unicast method as the sole method of transmission. In one embodiment of the present invention, routine 214 performs this check to ensure that a user preference is not ignored.

Figure 6:
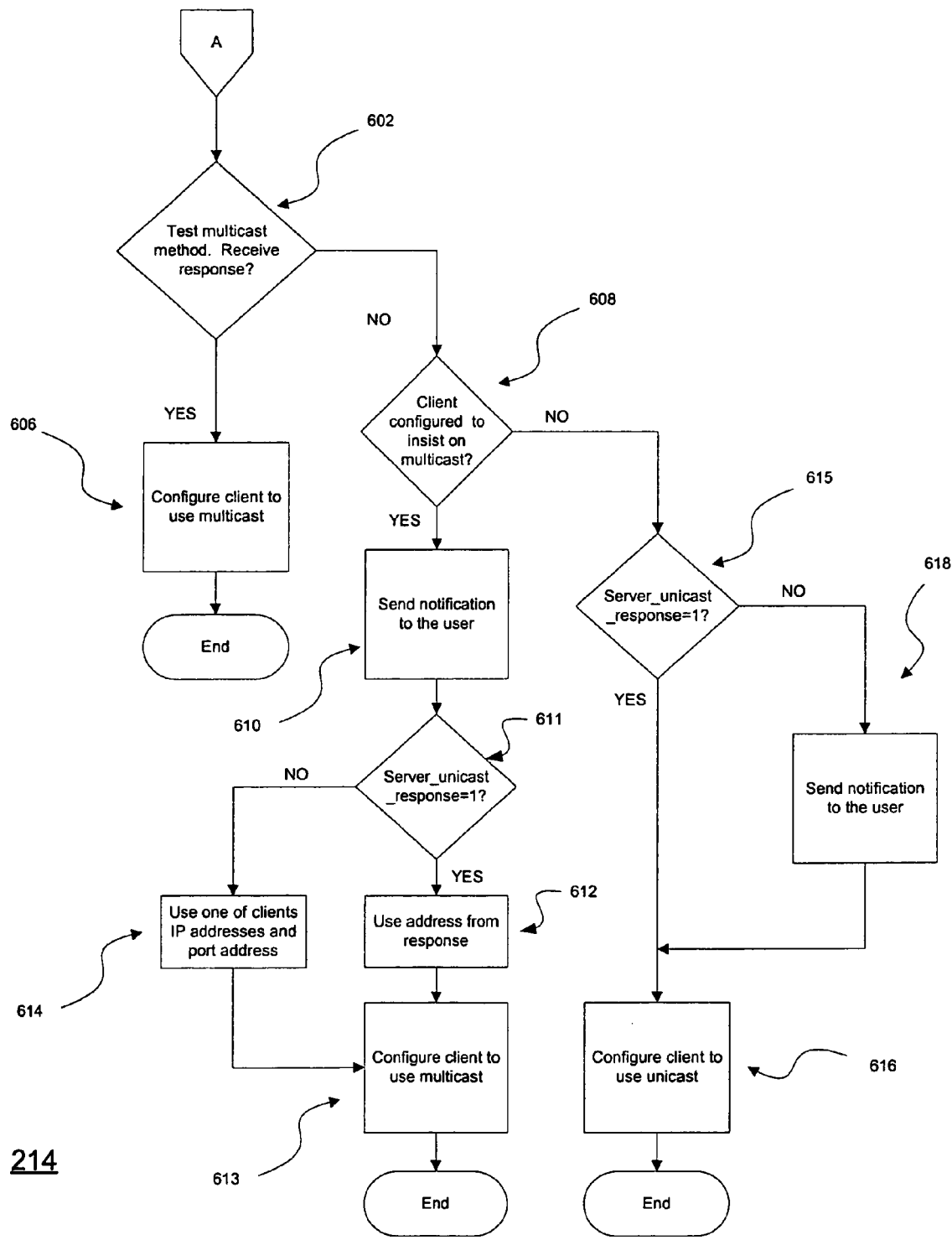
FIG. 6 is a flowchart further depicting the steps performed by a client to automatically sense a transmission method consistent with one embodiment of the present invention.

If client 112 is not configured to insist upon the unicast method, the processing flows to step 602 (FIG. 6). If client 112 is configured to insist upon the unicast transmission method, processing flows to step 512 where routine 214 determines whether a valid response was received from server 114 during testing of the unicast transmission method. If a valid response has been received, then routine 214 proceeds to step 514, where client 112 configures for transmission in accordance with the unicast method. In one embodiment, when a response from server 114 is received, client 112 will use the destination IP address (DADDR) and destination port number (DPORT) values from the server response packet as the client IP address and UDP port in its server registration.

If no valid response was received from the test of the unicast method (step 512), processing flows to step 516, where routine 214 sends a notification to the user. In one embodiment, the notification will explain that while client 112 has been configured to insist on unicast, client 112 has been unable to communicate with server 114 via the unicast method. The user will further be advised that the present system will nevertheless configure for the unicast transmission method. In one embodiment, because no server response was received, client 112 does not have an IP address or port number to place in its packets. Consequently, client 112 may use one of its machine's possibly multiple IP addresses, chosen arbitrarily, and its local UDP port number. Processing will then flow to step 514, where routine 214 will configure for transmission via the unicast method.

Referring now to FIG. 6, there is shown the processing performed by client 112 to test the multicast method. If client 112, at step 508 (FIG. 5), has not been configured to insist on the unicast method, processing will flow to step 602 (FIG. 6) where routine 214 will test the multicast method. If routine 214 receives a server response during the test, it configures client 112 for transmission in accordance with the multicast transmission method (step 606). In one embodiment, because a response from server 114 was received, client 112 may use the DADDR and DPORT values from the server response packet as the client IP address and UDP port in its server registration. If no response was received from server 114, then processing flows to step 608, where routine 214 must determine whether client 112 has been configured to insist upon the multicast method.

If client 112 is configured to insist upon the multicast method, then routine 214 displays a notification to the user explaining that while client 112 has been configured to insist on multicast, it has been unable to communicate with server 114 via multicast (step 610). The user will further be advised that routine 214 will nevertheless configure client 112 to communicate via the multicast transmission method. Routine 214 then proceeds to step 611, where it determines if a unicast response was received from server 114. In one embodiment, because a response from server 114 was received, client 112 will use the DADDR and DPORT values from the server response packet as the client IP address and UDP port in its server registration (step 612). Processing will then flow to step 613 where routine 214 configures client 112 to communicate in accordance with the multicast transmission method. If, however, at step 611, routine 214 determines that a unicast server response was not received, processing flows to step 614. In one embodiment, because no server response was received, client 112 does not have an IP address or port number to place in its packets. Consequently, client 112 may use one of its machine's possibly multiple IP addresses, chosen arbitrarily, and its local UDP port number (step 614). Processing will then flow to step 613 where it configures client 112 to communicate in accordance with the multicast transmission method.

If however, client 112 has not been configured to insist upon multicast (step 608), then processing proceeds to step 615 where routine 214 has determined that client 112 has not been configured to insist upon the multicast method, and that client 112 was unable to communicate with server 114 via multicast. As a result, routine 214 will therefore resort to the use of the unicast method. If at step 615, routine 214 received a successful response from server upon testing the unicast method, then client 112 may be configured at step 616 for communication in accordance with the unicast method. In one embodiment, because a response from server 114 was received, client 112 will use the DADDR and DPORT values from the ECHO-REPLY packet as the client IP address and UDP port in its server registration. If no server response was received during the testing of the unicast method, then processing flows to step 618, where client 112 displays a notification to the user explaining that client 112 has been unable to communicate with server 114 via the multicast or unicast methods before configuring for communication in accordance with the unicast method at step 616. In one embodiment, because no server reply was received, the client uses one of its machine's possibly multiple IP addresses, chosen arbitrarily, and its local UDP port number.

Figure 7:
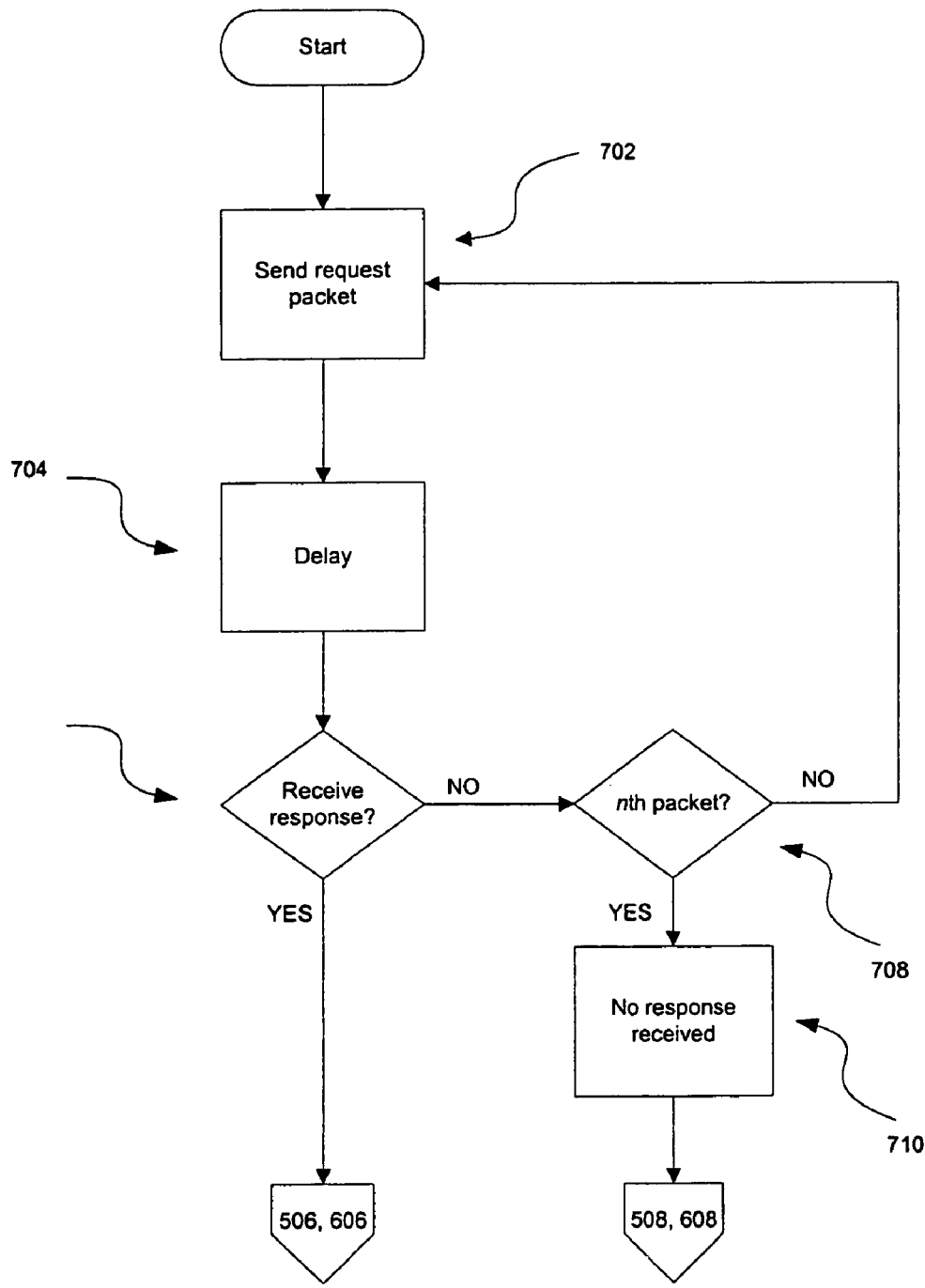
FIG. 7 is a flowchart depicting the steps performed by a client to test a transmission method consistent with one embodiment of the present invention.

Referring now to FIG. 7, there is shown a flowchart depicting the steps performed by routine 214 to test the unicast method at step 502 (FIG. 5), and the multicast method at step 602 (FIG. 6). In operation, routine 214 sends a first request packet to server 114 with which it is attempting to register/communicate (step 702). At this step, routine 214 will send the request packet using whichever transmission method it is attempting to test. For example, if routine 214 is attempting to test the multicast method (step 602) then it will send the packet using the multicast method. On the other hand, if routine 214 is attempting to test the unicast method (step 502) then it will send the packet via the unicast method.

In one embodiment, the routine 214 at step 702, will transmit request packets in the form of auto-sensing packets with a payload of the following form:

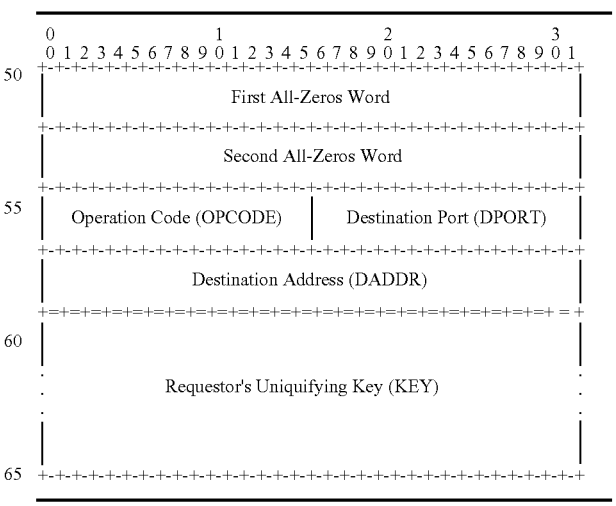

As shown above, the first two 32-bit words will be all zeros, to help distinguish these packets from packets using other higher-level protocols, especially the Real-Time Protocol (RTP). RTP packets, as is known by those skilled in the art, always contain a non-zero version number within the first word. This allows servers 114 to receive, and properly interpret, packets of other protocols on the same UDP ports as are used by the protocol described in this document.

In one embodiment, all auto-sensing request packets sent by client 112 via the unicast transmission method will have the following format and data. The Operation Code (OPCODE) will be set to ECHO-REQUEST, designating the packet as a request packet. The Destination Address (DADDR) field will be set to the SUA and the Destination Port (DPORT) field to SUP. The KEY field (which appears to the server as the EXTRA-BYTES field) will contain a random number (say, 64 bits or more). Any response received to a given request packet will have the identical random number in its KEY field. The KEY field thus serves as a uniquifying key, allowing allow client 112 to match a response to a given request. An auto-sensing request packet sent via the multicast method will have an OPCODE and KEY field set in the same manner, however, the DADDR field will contain the SMA, and the DPORT field will contain the SMP of server 114.

Once the request packet has been sent, routine 214 waits for a response (step 704). There is no predetermined length for the delay, as it may be tailored on each individual network based on factors such as the number of clients, response time between clients, etc. In addition, the delay may be of the same length at each repetition of the test. For example, the delay may be constant, i.e. 200 milliseconds for each repetition of the test, or it may vary, i.e. the client may pause 200 milliseconds for each of the first 5 repetitions the test, and then pause 1000 milliseconds for the next 5 repetitions. Upon expiration of the delay, test 502, 602 then determines whether a response packet was received (step 706). If a response packet is received, processing flows to step 506 or 606. If a response packet is not received, processing flows to step 708, where test 502, 602 determines whether a predetermined number of test packets have been transmitted. In other words, client 112 may be configured to transmit a predetermined number of request packets (e.g. 10) prior to aborting the test for non-receipt of a response packet. If the predetermined number of request packets has not yet been sent (step 708), then client 112 returns to step 702 and another request packet is transmitted. If the predetermined number of request packets have been sent, then the test determines that no response packet was received (step 710), and processing flows to step 508 or 608.

In one embodiment, client 112 could instead use a prior transmission as proof of the success of a given transmission method. For example, if client 112 has been communicating with server 114, client 112 could have received a packet or communication from that host. If that communication were conducted in accordance with the unicast method, it would be unnecessary to send a packet using unicast to further test the connection. Instead, the packet received from server 114 could act as a response packet reporting a successful transmission in accordance with the unicast method.

Figure 8:
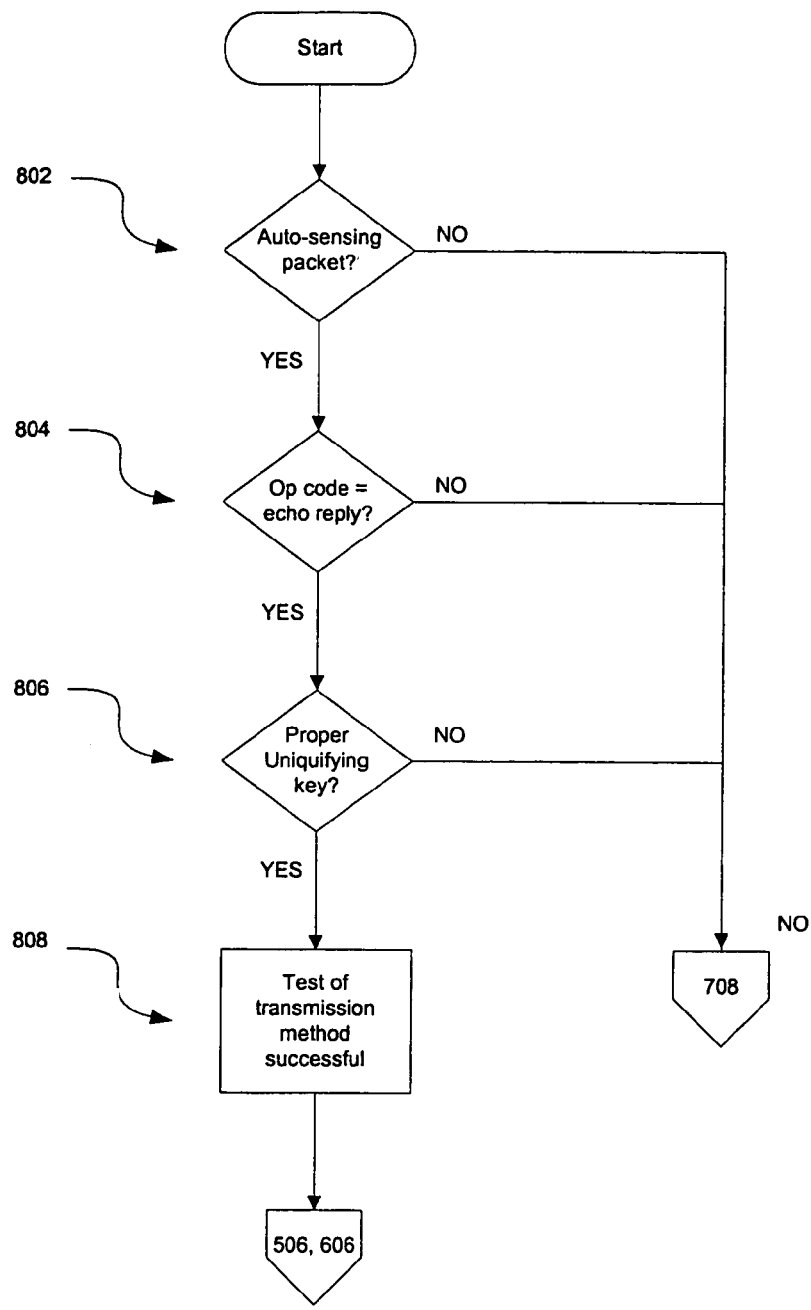
FIG. 8 is a flowchart depicting the steps performed by a client to identify whether a packet received is an auto-sensing response packet consistent with one embodiment of the present invention.

Client 112 must then determine if a received packet is a response packet. In one embodiment, the response packet could be any packet transmitted in accordance with the tested transmission method that evidences that a successful transmission has taken place. In another embodiment, a response packet may take the form of an auto sensing response packet. Referring now to FIG. 8, there is shown a detailed flowchart depicting the steps performed at step 706 to determine if a packet received is a auto-sensing response packet. When a packet is received during the test, client 112 determines if it is an auto-sensing packet (step 802). As described above, an auto-sensing packet will have two 32-bit words consisting of all zeros. If test 706 determines that a received packet is an auto-sensing packet, processing flows to step 804. If test 706 determines that a received packet is not an auto-sensing packet, processing flows to step 708 (FIG. 7). In step 804, test 706 then determines whether the received packet is a response packet. As previously stated, test packets sent by client 112, in accordance with the unicast transmission method, will have an operation code (OPCODE) is set to ECHO-REQUEST. Responses to ECHO-REQUEST packets (response packet) will have an OPCODE set to ECHO-REPLY. If the OPCODE received is not equal to ECHO-REPLY, the received packet is not a response packet, and processing flows to step 708 (FIG. 7). If the OPCODE is set to ECHO-REPLY, processing flows to step 806, where client 112 determines whether the KEY field contains a random number identical to the random number transmitted in step 702 (FIG. 7). If the KEY field is identical, processing flows to step 808. An identical KEY identifies the received transmission as a reply to the test packet transmitted by client 112. Step 808 reports a successful response, and thus a successful test of the transmission method. Processing then flows to step 506 or 606. If the KEY field is not identical, the received response packet is not a response to the request packet, and processing flows to step 708 (FIG. 7).

Figure 9:
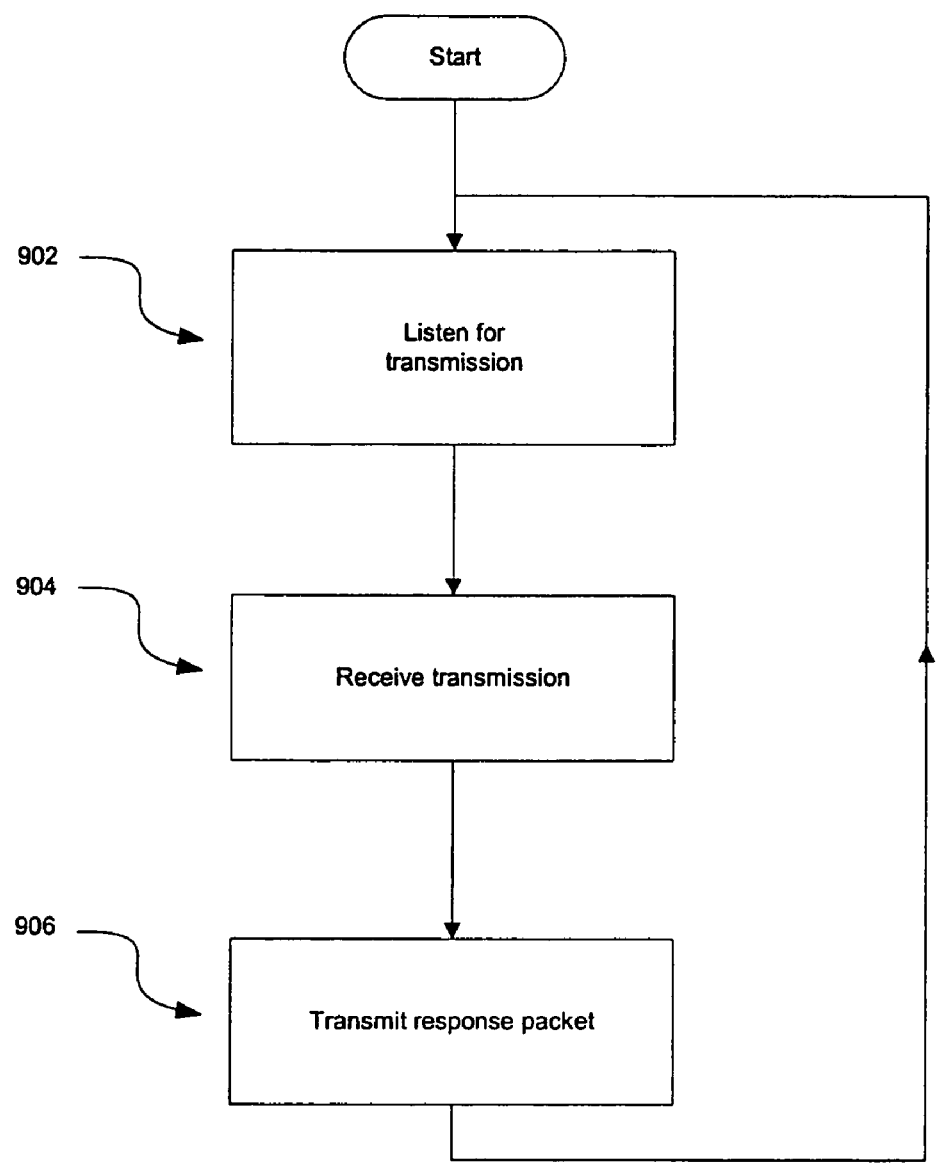
FIG. 9 is a flow chart depicting the behavior of a server consistent with one embodiment of the present invention.

Referring now to FIG. 9, there is shown a detailed flow chart depicting the steps performed by server 114 when it receives a request packet. As shown in FIG. 9, server auto-sensing routine 318 operating in memory 300 of server 114 listens for unicast auto-sensing request packets sent to one of its associated IP addresses (SUA) 312 at a particular UDP port (SUP). Server 114 may also listen for multicast UDP packets sent to a multicast IP address (SMA) and port (SMP) computed from SUA and SUP. Once server 114 receives a request packet, (step 904), it will send a response (step 906). In one embodiment, if the request packet is not an auto-sensing request packet, then the response may take the form of any response evidencing a successful transmission.

If, however, the request packet takes the form of an auto-sensing request packet, the response packet will take the form of an auto-sensing response packet modified from its original form. In this case the modified packet functions as a response packet, reporting the success of the test packet. In one embodiment, this response packet will take the form of a modified, ECHO-REQUEST, UDP auto-sensing packet.

Figure 10:
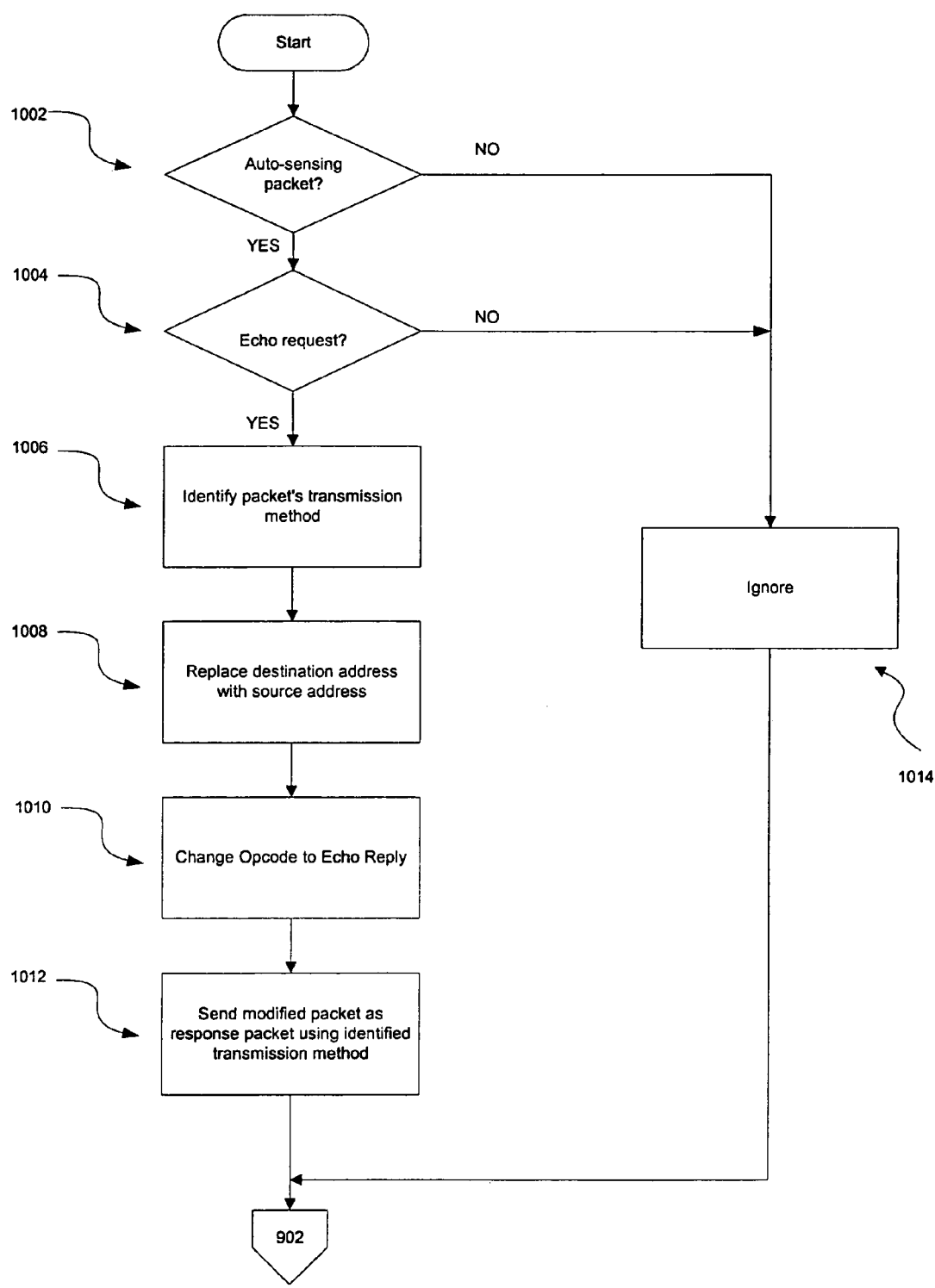
FIG. 10 is a flow chart depicting the steps performed by a server to identify and respond to auto-sensing request packets received consistent with one embodiment of the present invention.

FIG. 10 shows a flowchart depicting the steps performed by one embodiment of server 114 to identify and respond to an ECHO-REQUEST UDP auto-sensing packet, step 906, (FIG. 9). Processing begins by first determining if the request packet is in the auto-sensing format. If the packet does not take the form of an auto-sensing packet, server 114 proceeds to step 1014, and ignores the packet, before returning to step 902 (FIG. 9). If the request packet is an auto-sensing packet, then processing flows to step 1004, where server 114 determines if the packet is an ECHO-REQUEST packet. If the auto-sensing .packet is not an ECHO-REQUEST, then it is not a request packet, it does not require a response from server 114, and processing again flows to step 1014.

If the packet is an ECHO-REQUEST packet, processing flows to step 1006, where server auto-sensing routine 318 identifies the transmission method by which the request packet was sent. Once identified, server 114 proceeds to step 1008 where it readdresses the packet for transmission back to client 112 by replacing the destination port (DPORT) and IP addresses (DADDR) with the source port and IP address 212 from the packet header. Server 114 may then proceed to step 1010 where it will change the OPCODE to ECHO-REPLY to denote that the response packet is in reply to a specific request packet. In one embodiment, after these modifications have been made, the new ECHO-REPLY response packet will contain the same EXTRA-BYTES data as in the original ECHO-REQUEST packet.

Finally, server 114 will send the modified packet using the same transmission method as the request packet (step 1012). For example, if the original ECHO-REQUEST packet was received via unicast, then the ECHO-REPLY packet is sent via unicast. If the original ECHO-REQUEST packet was received via multicast, then the ECHO-REPLY packet is sent via multicast. Once sent, server 114 returns to step 902 (FIG. 9) to await another packet transmission.

In another embodiment, if server 114 determines that the request packet received is not an auto-sensing packet (step 1002) or not an ECHO-REQUEST packet (step 1004), then it may respond in any number ways. Server 114 may ignore the transmission (step 1014), may send an error message to the client, or may send back a response indicating whether the transmission of the packet was successful or unsuccessful. In each of these embodiments, the response by server 114, will serve as a response packet, indicating to client 112 the success or non-success of the original transmission.

It will be known to those of ordinary skill in the art that while client auto-sensing routine 214, and server auto-sensing routine 318 are depicted as being resident in memory, such a routine may be resident on a removable storage medium such as floppy disk or as a network application being run from another network computer.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method performed by a computer having a processor and a memory for determining a transmission method for a network communication, the method comprising:

generating a first random number;

transmitting from a client at least one packet containing the first random number to a server via a unicast transmission method, the client being of a first network and the server being of a second network, the first network and the second network being connected via a router;

when it is determined that the client is configured to insist on the unicast transmission method, with a processor, configuring the client for communication with the server in accordance with the unicast transmission method and when it is determined that a response to the packet containing the first random number sent via the unicast transmission method is not received at the client, notifying a user; and when it is determined that the client is not configured to insist on the unicast transmission method, generating a second random number, transmitting from the client at least one packet to the server via a multicast transmission method, the at least one packet containing the second random number, when it is determined that a response to the packet containing the second random number sent via the multicast transmission method is received at the client, indicating that the router supports the multicast transmission method, with a processor, configuring the client for communication with the server in accordance with the multicast transmission method of the client, and when it is determined that a response to the packet containing the second random number sent via the multicast transmission method is not received at the client, indicating that the router does not support the multicast transmission method, when it is determined that the client is not configured to insist on the multicast transmission method, with a processor, configuring the client for communication with the sever in accordance with the unicast transmission method and when it is determined that a response to the packet containing the first random number sent via the unicast transmission method is not received at the client, notifying a user, and when it is determined that the client is configured to insist on the multicast transmission method, notifying the user, when it is determined that a response to the packet containing the first random number sent via the unicast transmission method is received at the client, with a processor, configuring the client for communication with the server in accordance with the multicast transmission method of the client using an address from the received response, and when it is determined that a response to the packet containing the first random number sent via the unicast transmission method is not received at the client, with a processor, configuring the client for communication with the server in accordance with the multicast transmission method of the client using an address of the client.

2. A computer-readable storage medium containing computer-executable instructions which, when executed by a computer having a memory and a processor, cause the computer to:

generate a first random number;

transmit at least one packet containing the first random number to a host via a unicast transmission method, the computer being of a first network and the host being of a second network, the first network and the second network being connected via a router;

when it is determined that the unicast transmission method is to be used, with a processor, configure for communication with the host in accordance with the unicast transmission method when it is determined that a response packet containing the first random number sent via the unicast transmission method is received from the host, configure for communication with the host in accordance with the unicast transmission method and when it is determined that a response packet containing the first random number sent via the unicast transmission method is not received from the host, notify a user; and when it is determined that the unicast transmission method need not be used, generate a second random number, transmit at least one packet containing the second random number to the host via a multicast transmission method, when it is determined that a response packet containing the second random number sent via the multicast transmission method is received from the host, indicate that the router supports the multicast transmission method and, with a processor, configure for communication with the host in accordance with the multicast transmission method, and when it is determined that a response packet containing the second random number sent via the multicast transmission method is not received from the host, indicate that the router does not support the multicast method, when it is determined that the multicast transmission method is to be used, notify the user, when it is determined that a response to the packet containing the first random number sent via the unicast transmission method is received from the host, with a processor, configure for communication with the host in accordance with the multicast transmission method using an address from the received response, and when it is determined that a response to the packet containing the first random number sent via the unicast transmission method is not received from the host, with a processor, configure for communication with the host in accordance with the multicast transmission method using an address of the computer, and when it is determined that the multicast transmission method need not be used, with a processor, configure for communication with the host in accordance with the unicast transmission method and when it is determined that a response to the packet containing the first random number sent via the unicast transmission method is not received from the host, notifying a user.

3. The computer-readable storage medium of claim 2 further comprising contents that cause the computer to, responsive to determining that a response packet containing the first random number sent via the unicast transmission method is not received from the host, configure for communication with the host in accordance with the unicast transmission method using an IP address of the computer.

4. The computer-readable storage medium of claim 2 further comprising contents that cause the computer to, responsive to determining that a response packet containing the first random number sent via the unicast transmission method is not received from the host, configure for communication with the host in accordance with the multicast transmission method using an IP address of the computer.

5. The computer-readable storage medium of claim 2, wherein the configuration in accordance with the unicast transmission method includes using an address from a response packet to one of the at least one packet received from the host and containing the first random number transmitted to the host via the unicast transmission method.

6. The computer-readable storage medium of claim 2, wherein the configuration in accordance with the unicast transmission method includes using one of the computer's own IP addresses.

7. A computing system having a memory and a processor for determining a transmission method for a network communication, comprising:

a processor;

a component that generates a first random number;

a component that transmits at least one packet containing the first random number to a host via a unicast transmission method, the computing system being of a first network and the host being of a second network, the first network and the second network being connected via a router;

a component that, when it is determined that the unicast transmission method is to be used, configures the computing system for communication with the host in accordance with the unicast transmission method and when it is determined that a response packet containing the first random number sent via the unicast transmission method is not received from the host, notifies a user; and a component that, when it is determined that the unicast transmission method need not be used, generates a second random number, transmits at least one packet containing the second random number to the host via a multicast transmission method, when it is determined that a response packet containing the second random number sent via the multicast transmission method is received from the host, indicates that the router supports the multicast transmission method and configures the computing system for communication with the host in accordance with the multicast transmission method, and when it is determined that a response packet containing the second random number sent via the multicast transmission method is not received from the host, indicates that the router does not support the multicast transmission method, when it is determined that the multicast transmission method is to be used, notifies the user, when it is determined that a response to the packet containing the first random number sent via the unicast transmission method is received from the host, configures the computing system for communication with the host in accordance with the multicast transmission method using an address from the received response, and when it is determined that a response to the packet containing the first random number sent via the unicast transmission method is not received from the host, configures the computing system for communication with the host in accordance with the multicast transmission method using an address of the computing system, and when it is determined that the multicast transmission method need not be used, configures the computing system for communication with the host in accordance with the unicast transmission method and when it is determined that a response to the packet containing the first random number sent via the unicast transmission method is not received from the host, notifies a user wherein the components comprise computer-executable instructions stored in memory for execution by the processor.

\* \* \* \* \*

UNITED STATES PATENT AND TRADEMARK OFFICE
CERTIFICATE OF CORRECTION

PATENT NO. : 7,577,140 B2
APPLICATION NO. : 11/049330
DATED : August 18, 2009
INVENTOR(S) : Pavel Curtis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Seventh Day of September, 2010

David J. Kappos
*Director of the United States Patent and Trademark Office*